June 23, 1953     K. M. SIMPSON     2,643,342

IONIZATION GAUGE

Filed Jan. 17, 1947

INVENTOR
KENNETH M. SIMPSON

BY *Robert A. Levinder*

ATTORNEY

UNITED STATES PATENT OFFICE 2,643,342

IONIZATION GAUGE

Kenneth M. Simpson, Santa Barbara, Calif., assignor to the United States of America as represented by the United States Atomic Energy Commission Application January 17, 1947, Serial No. 722,718

2 Claims. (Cl. 250—41.9)

This invention relates to an improved ionization gauge for a mass spectrometer.

An object of this invention is to provide an improved ionization gauge of the Phillips or Penning type employing the magnetic field of the mass spectrometer.

Other and further objects of this invention will be apparent to those skilled in the art to which it relates from the following specification, claims and drawing.

The present invention includes a number of elements and features providing a novel and advantageous ionization gauge, and of these the following are noted:

1. The cathodes overhang the ring-shaped anode, rendering the calibration of the gauge substantially independent of magnetic field strength variation and of the orientation of the axis of the gauge with respect to the magnetic field over a wide range (of about ±30°).

2. A shield provided between the cathodes and the mass spectrometer beam prevents leakage of stray ions and electrons from the beam into the gauge, thus rendering the gauge sensitivity independent of mass spectrometer beam intensity when same is employed with a mass spectrometer or like instrument.

3. A. C. voltage is applied between the cathode and the anodes, the gauge performing its own rectification.

It is proposed to utilize the sharp threshhold of the pressure characteristic of this gauge for hunting gas leaks.

Figure 1:
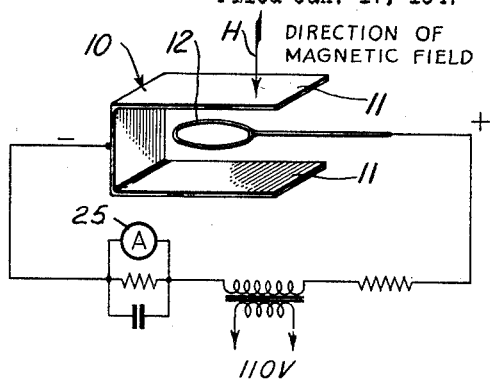
Figure 2:
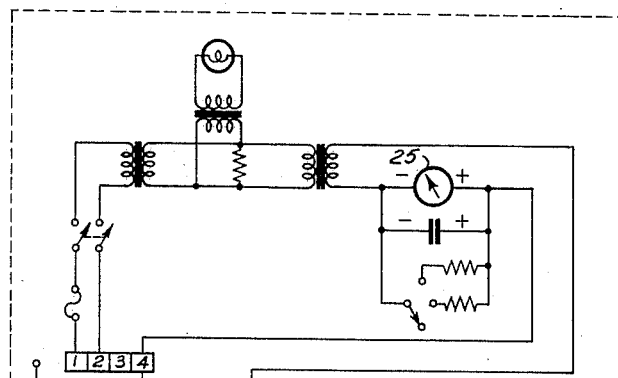
Figure 3:
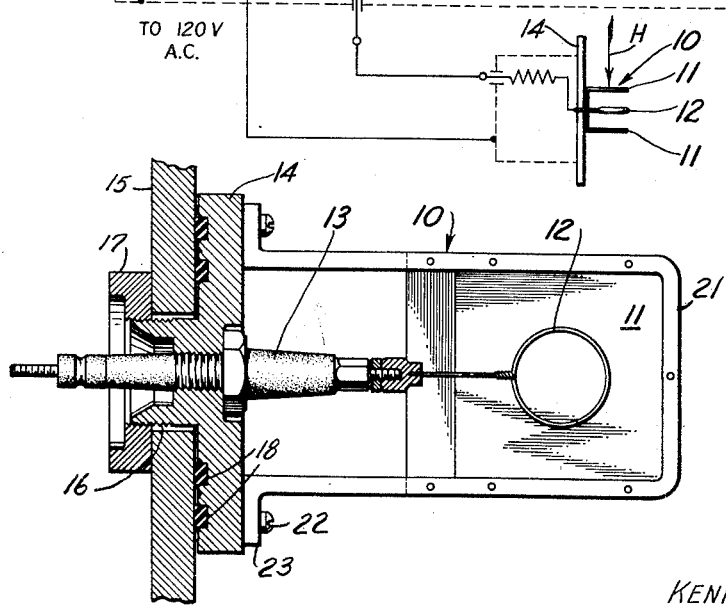

Referring to the drawing briefly, Figure 1 is a schematic showing of an embodiment of this invention;

Fig. 2 is a schematic wiring diagram showing an embodiment of this invention; and Fig. 3 shows constructional details of this invention.

Referring to the drawing in detail, reference numeral 10 designates an improved Phillips or Penning type pressure gauge positioned in the magnetic field H of the mass spectrometer. This improved pressure gauge basically includes a pair of cathodes 11 disposed on opposite sides of an anode 12, all of the electrodes being supported in an atmosphere, the pressure of which is to be determined. Ordinarily, when measuring extremely low pressures, the ignition voltage of glow discharge is so high as to make it difficult or impossible to effect the ignition, and the current intensity of the discharge is so small that it could be measured only by extremely sensitive apparatus. Therefore, magnets are commonly disposed adjacent the electrodes for setting up a magnetic field thereby to amplify the current intensity and thus decrease the required ignition voltage, and in the present invention it is contemplated that this magnetic field will be provided by the mass spectrometer or like device with which the invention is associated and that this magnetic field will encompass substantially the entire cathode area.

Considering the structural details of one embodiment of the invention, as shown in Fig. 3, it will be noted that gauge 10 is disposed internal to a mass spectrometer chamber defined by wall 15 shown in part only. Gauge 10 is rigidly secured to a mounting plate 14 which is disposed about an aperture in the mass spectrometer wall 15. Mounting plate 14 has a cylindrical boss 16 formed thereon which extends through the aperture in wall 15 and by means of cooperating threads engages a clamping nut 17 exterior to the mass spectrometer chamber and in contact with wall 15 thereof. Mounting plate 14 is secured in position by tightening clamping nut 17 which thereby draws plate 14 into intimate contact with wall 15, and annular gaskets 18 may provide about the aperture in wall 15 between plate 14 and wall 15 whereby a vacuum-tight seal is provided upon tightening clamping nut 17.

Gauge 10 includes a U-shaped member 21 extending into the mass spectrometer chamber with the closed end thereof innermost and member 21 may be secured in this position by screws 22 passing through flanges 23 formed at the open ends of member 21 and engaging plate 14, or any other suitable means providing rigid support of member 21. A suitable connecting element such as a spark plug 13 extends through mounting plate 14 in vacuum-tight relation thereto to provide electrical connection from gauge 10 to the outside of the mass spectrometer chamber and to provide mechanical support for anode 12 of gauge 10 disposed within member 21.

Cathodes 11, preferably in the form of substantially flat rectangular plates, are secured one to each side of U-shaped member 21 to define a chamber within the U and extending from the closed end thereof approximately to the end of spark plug 13 which protrudes into the U as noted above. The chamber defined by cathodes 11 and member 21 is open at the end facing mounting plate 14 to allow free gas communication and pressure equalization between the interior thereof and the mass spectrometer chamber.

Anode 12 may be advantageous by being formed in the shape of a ring having a diameter which is substantially less than the length and width of cathode plates 11 and may be centrally disposed between cathodes 11 in a plane substantially parallel thereto; being secured in this position by a stem rigidly connecting anode ring 12 and spark plug 13. It will be noted that anode 12 is disposed within the chamber formed by cathodes 11 and member 21 so as to be shielded from stray ions and electrons within the mass spectrometer chamber and also that cathodes overhang anode 12 so that discharge therebetween is substantially independent of magnetic field alignment within about ±30 degrees and magnetic field intensity above a minimum dependent upon the electrode potentials employed.

As may be noted in Fig. 2, a regulated alternating current voltage is applied between the cathode and the anodes, the gauge performing its own rectification. The sharp threshold of the pressure characteristic of the gauge adapts it for hunting gas leaks which vary the discharge current as indicated by meter 25 in the electrical circuit thereof.

While I have described the salient features of this invention in detail with respect to one embodiment, it will of course be apparent that numerous modifications may be made within the spirit and scope of this invention and I do not therefore desire to limit the invention to the exact details shown except in so far as they may be defined in the following claims.

What is claimed is:

1. In combination with a mass spectrometer adapted to transmit a beam of charged particles within a tank having a magnetic field passing therethrough; an ionization gauge within said tank displaced from the beam path, said gauge having a gaseous region therein communicating with the space in the tank and means for projecting charged particles through the gaseous region under the influence of said magnetic field, a shield disposed about said gaseous region to prevent stray charged particles from the beam from entering said region, and means for measuring the degree of ionization produced in said region by said particles.

2. A pressure gauge comprising a pair of parallel spaced cathodes separated by an ionizable atmosphere and defining a discharge region therebetween, means establishing a magnetic field substantially coextensive with and normal to said cathodes through said region, a substantially ring-shaped anode disposed intermediate said cathodes, said anode lying wholly within said magnetic field in a plane parallel to said cathodes and having a diameter substantially less than the dimensions of the adjacent surfaces of said cathodes, means impressing a potential between said cathodes and anode whereby a discharge is produced therebetween which is proportional to the pressure of said ionizable atmosphere within wide limits of variation of direction and intensity of said magnetic field, and measuring means for indicating the current flow between said cathodes and anode.

KENNETH M. SIMPSON.

References Cited in the file of this patent
UNITED STATES PATENTS

| Number | Name | Date |
| --- | --- | --- |
| 2,197,079 | Penning | Apr. 16, 1940 |
| 2,374,205 | Hoskins | Apr. 24, 1945 |
| 2,383,600 | Grosdoff | Aug. 28, 1945 |
| 2,490,468 | Picard | Dec. 6, 1949 |
| 2,506,431 | Perret et al. | May 2, 1950 |